(12) United States Patent
Nagao et al.

(10) Patent No.: US 8,531,269 B2
(45) Date of Patent: Sep. 10, 2013

(54) AUTOMATIC LOCKING APPARATUS

(75) Inventors: Satoshi Nagao, Kariya (JP); Kazunari Nakamura, Nishio (JP); Hironori Mitsubayashi, Aichi-ken (JP); Mitsuru Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 386 days.

(21) Appl. No.: 12/807,169

(22) Filed: Aug. 30, 2010

(65) Prior Publication Data
US 2011/0057772 A1 Mar. 10, 2011

(30) Foreign Application Priority Data

Aug. 31, 2009 (JP) ................................. 2009-199446

(51) Int. Cl.
*G05B 19/00* (2006.01)

(52) U.S. Cl.
USPC ..... 340/5.61; 340/5.6; 340/5.72; 340/426.16; 340/539.1; 340/686.1

(58) Field of Classification Search
USPC ........... 340/5.6, 5.61, 5.64, 5.7–5.72, 426.28, 340/426.29, 426.16, 426.19, 426.22, 426.23, 340/426.25, 539.1–539.23, 545.9, 686.1
See application file for complete search history.

(56) References Cited

U.S. PATENT DOCUMENTS

| | | | |
|---|---|---|---|
| 7,696,859 B2 * | 4/2010 | Teshima et al. | 340/5.72 |
| 8,054,158 B2 * | 11/2011 | Nakashima | 340/5.61 |
| 2004/0142732 A1 | 7/2004 | Ueda et al. | |
| 2007/0120645 A1 | 5/2007 | Nakashima | |
| 2007/0132553 A1 | 6/2007 | Nakashima | |
| 2007/0216517 A1 * | 9/2007 | Kurpinski et al. | 340/5.72 |

FOREIGN PATENT DOCUMENTS

| | | |
|---|---|---|
| JP | 2003-020836 | 1/2003 |
| JP | 2005-213987 | 8/2005 |
| JP | 3913659 | 2/2007 |
| JP | 3917497 | 2/2007 |
| JP | 2007-146440 | 6/2007 |
| JP | 2007-146441 | 6/2007 |
| JP | 3976186 | 6/2007 |
| JP | 2007-217968 | 8/2007 |

OTHER PUBLICATIONS

Office action dated Jun. 18, 2013 in corresponding Japanese Application No. 2009-199446.

* cited by examiner

*Primary Examiner* — George Bugg
*Assistant Examiner* — Sharmin Akhter
(74) *Attorney, Agent, or Firm* — Harness, Dickey & Pierce, PLC

(57) ABSTRACT

An automatic locking apparatus which is installed in a vehicle, communicates with a portable-unit in areas inside/outside the vehicle, and automatically locks doors, based on whether a response-signal is received from the portable-unit and opening/closing of the doors. The apparatus includes a door-opening/closing-detecting-unit, an inside-of-vehicle-determining-unit forming a communication-area inside the vehicle when one door changes from the opened-state to the closed-state, and determining whether the response-signal is received, an outside-of-vehicle-determining-unit forming a communication-area outside the vehicle when the response-signal is not received, and determining whether the response-signal is received, a locking-control-unit automatically locking the doors when the response-signal is received, when all the doors are closed and presence-of-reception is changed to absence-of-reception, and a storing-unit storing history-information indicating that the response-signal is received. When the response-signal is not received, and the storing-unit stores history-information, the locking-control-unit automatically locks the doors when all the doors are closed and reception is absent.

7 Claims, 4 Drawing Sheets

AUTOMATIC LOCKING APPARATUS

CROSS REFERENCE TO RELATED APPLICATION

This application is based on and claims the benefit of priority from earlier Japanese Patent Application No. 2009-199446 filed Aug. 31, 2009, the description of which is incorporated herein by reference.

BACKGROUND OF THE INVENTION

1. Technical Field of the Invention

The present invention relates to an automatic locking apparatus which automatically locks doors of a vehicle.

2. Related Art

Japanese Unexamined Patent Application Publication No. 2005-213987 discloses a door locking apparatus for a vehicle, which is one example of a conventional technique for automatically locking doors of a vehicle.

The above door locking apparatus includes a portable unit, which a passenger of the vehicle carries, and an in-vehicle unit, which is provided in the vehicle. When a door is dosed, a transmitter of the in-vehicle unit transmits a request signal to the portable unit. Then, when a receiver of the in-vehicle unit cannot receive checking data from the portable unit within a predetermined period of time, the in-vehicle unit locks the door. Accordingly, in the case where outputs of the transmitter and the receiver are adjusted, and the communication area is set inside the vehicle (in the interior of the vehicle) and at the periphery of the vehicle, the door can be quickly locked immediately after the passenger carrying the portable unit gets out of the vehicle.

Meanwhile, in the communication area at the periphery of the vehicle (detection area of the portable unit), a case can be assumed that a state in which checking data transmitted from the portable unit can be received changes to a state in which the checking data cannot be received. In this case, the door may be automatically locked after confirming that the passenger carrying the portable unit has got out of and gone away from the vehicle.

However, in the case where a plurality of passengers open the doors corresponding to a plurality of seats such as the driver's seat and the passenger seat and get out of the vehicle, when the passenger carrying the portable unit closes the door before the other passengers close the doors, and leaves the communication area, the doors may not be automatically locked. Hence, the passenger carrying the portable unit has to wait near the vehicle until all the doors are closed.

SUMMARY OF THE INVENTION

The present invention has been made in consideration of the foregoing conventional situation, and an object of the present invention is to provide an automatic locking apparatus which automatically locks doors of a vehicle when all the doors are closed, even when a portable unit is not present in detection areas outside the vehicle.

In order to achieve the object, the present invention provides, as one aspect, an automatic locking apparatus which is installed in a vehicle having a plurality of doors, communicates with a portable unit in predetermined areas inside and outside the vehicle, and automatically locks the doors, based on whether or not a response signal is received from the portable unit, and opened and closed states of the doors, the response signal including an identification signal having a predetermined relationship with an identification signal which is previously registered, the apparatus including: a door opening and closing detecting unit which detects an opened state and a closed state of the doors; an inside-of-vehicle determining unit which forms a communication area, which is for performing intercommunication with the portable unit, inside the vehicle when the door opening and closing detecting unit determines that one of the doors changes from the opened state to the closed state, and determines whether or not the response signal is received; an outside-of-vehicle determining unit which forms a communication area, which is for performing intercommunication with the portable unit, in a predetermined area outside the vehicle when the inside-of-vehicle determining unit determines that the response signal is not received, and determines whether or not the response signal is received; a locking control unit which automatically locks the doors when the outside-of-vehicle determining unit determines that the response signal is received, on the condition that the door opening and closing detecting unit detects the fact that all the doors are closed, and the condition that the determination result of the outside-of-vehicle determining unit is changed from presence of reception to absence of reception; and a storing unit which stores history information indicating that the response signal is received, when the outside-of-vehicle determining unit determines that the response signal is received, wherein when the inside-of-vehicle determining unit determines that the response signal is not received, and the storing unit stores history information, the locking control unit automatically locks the doors on the condition that the door opening and closing detecting unit detects the fact that all the doors are closed, and the condition that the determination result of the outside-of-vehicle determining unit is absence of reception.

DETAILED DESCRIPTION OF THE PREFERRED EMBODIMENTS

Hereinafter, embodiments of the present invention will now be described in connection with the accompanying drawings. In the embodiments set forth below, the components identical with or similar to each other are given the same reference numerals for the sake of omitting explanation.

An automatic locking apparatus according to the embodiment automatically locks doors 11 to 13 by using intercommunication between a vehicle-side unit and a portable unit 1. Specifically, the automatic locking apparatus is installed in a vehicle 10 having the doors 11 to 13, and communicates with the portable unit 1 within predetermined areas inside the vehicle 10 (in the interior of the vehicle) and outside the vehicle 10 (in the exterior of the vehicle). The automatic locking apparatus automatically locks the doors 11 to 13, based on whether or not a response signal is received from the portable unit 1, and the opened/closed states of the doors 11 to 13. The response signal includes an ID code (identification signal) having a predetermined relationship with a registration code (identification signal) which is previously registered. Note that, in the present embodiment, the automatic locking apparatus is applied to a vehicle having three doors (doors 11 to 13). However, the automatic locking apparatus can be applied to a vehicle having a plurality of doors, for example, four or more doors. In such a case, an object of the present invention can be also achieved.

Figure 1:
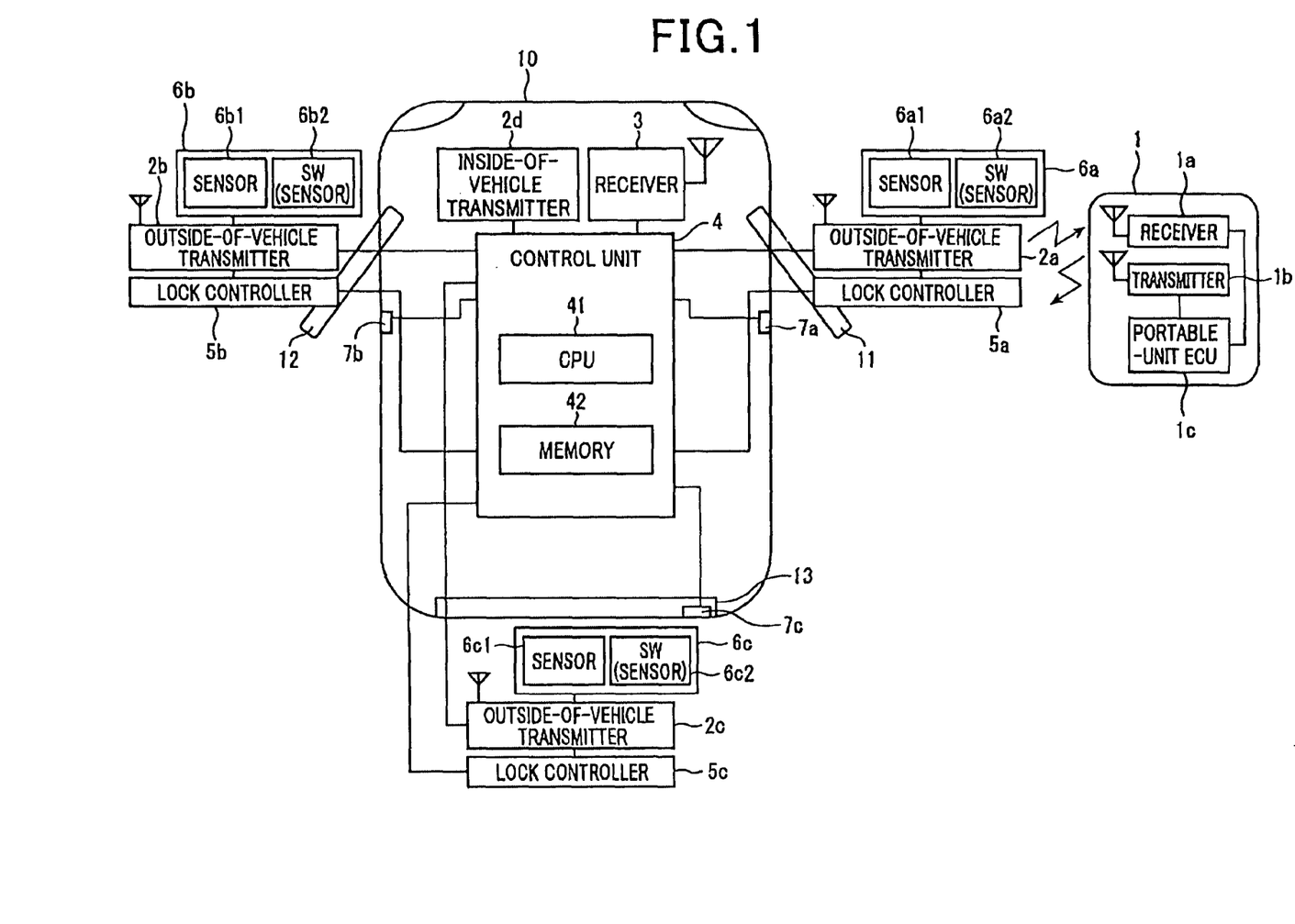
FIG. 1 is a block diagram schematically showing the configuration of an automatic locking apparatus according to an embodiment of the present invention.

As shown in FIG. 1, the portable unit 1 includes a receiver 1a and a transmitter 1b. The receiver 1a receives request signals from outside-of-vehicle transmitters 2a to 2c and an inside-of-vehicle transmitter 2d of the vehicle-side unit. The transmitter 1b transmits a response signal including an ID code in response to the received request signal. A portable-unit ECU (electronic control unit) is connected to the receiver 1a and the transmitter 1b, and executes various control processes. Specifically, the portable-unit ECU is determines whether or not a request signal is received based on a signal received by the receiver 1a. In addition, in response to the received request signal, the portable-unit ECU 1c generates a response signal including an ID code, and makes the transmitter 1b transmit the response signal.

The vehicle-side unit includes outside-of-vehicle transmitters 2a to 2c provided in the doors 11 to 13 of the vehicle 10 and the inside-of-vehicle transmitter 2d provided inside the vehicle. The outside-of-vehicle transmitters 2a to 2c and the inside-of-vehicle transmitter 2d transmit request signals based on a transmission indicating signal from a control unit 4 of the vehicle-side unit. Thereby, the vehicle-side unit (control unit 4) can communicate with the portable unit 1 within predetermined areas (communication areas) of the inside and outside of the vehicle 10. The control unit 4 is a computer including a CPU (central processing unit) 41 and a memory 42.

The distance traveled by the request signals of the outside-of-vehicle transmitters 2a to 2c is set to, for example, 0.7 to 1.0 m. The communication areas in which the transmitters 2a to 2c communicate with the portable unit 1 (first outside-of-vehicle communication area 2a1 to third outside-of-vehicle communication area 2c1) are periodically formed when the vehicle 10 is parked, or formed when the portable unit 1 is not present inside the vehicle after one of the doors 11 to 13 changes from the opened state to the closed state. The communication areas are formed in predetermined areas, which correspond to the distance traveled by the request signals, at the periphery of the doors 11 to 13 of the vehicle 10.

The first outside-of-vehicle communication area 2a1 is formed by the outside-of-vehicle transmitter 2a provided in the door 11. The second outside-of-vehicle communication area 2b1 is formed by the outside-of-vehicle transmitter 2b provided in the door 12. The third outside-of-vehicle communication area 2c1 is formed by the outside-of-vehicle transmitter 2c provided in the door 13.

The communication area in which the inside-of-vehicle transmitter 2d communicates with the portable unit 1 is formed, for example, when the engine starts, when the doors are locked, or when one of the doors 11 to 13 changes from the opened state to the closed state. The communication area is formed so as to cover the inside of the vehicle. In the present embodiment, the inside-of-vehicle transmitter 2d includes an inside-of-vehicle transmitter 2d for front seats, an inside-of-vehicle transmitter 2d for rear seats, and an inside-of-vehicle transmitter 2d for a luggage room, which are not shown in FIG. 1 (see FIGS. 3 to 6). The inside-of-vehicle transmitter 2d for front seats has a communication area mainly covering the front seats. The inside-of-vehicle transmitter 2d for rear seats has a communication area mainly covering the rear seats. The inside-of-vehicle transmitter 2d for the luggage room has a communication area mainly covering the luggage room. In this case, the total communication area, which is the combination of the inside-of-vehicle transmitter 2d for front seats, the inside-of-vehicle transmitter 2d for rear seats, and the inside-of-vehicle transmitter 2d for a luggage room, entirely covers the inside of the vehicle.

The inside-of-vehicle transmitter 2d may include an output level adjusting circuit (not shown). The output level adjusting circuit can change a request signal transmission output level. Thereby, the inside-of-vehicle transmitter 2d can change the dimensions of a transmission area of a request signal, that is, the dimensions of a communication area in which the inside-of-vehicle transmitter 2d communicates with the portable unit 1.

Hereinafter, the communication areas of the inside-of-vehicle transmitter 2d will be explained. The output level adjusting circuit of the inside-of-vehicle transmitter 2d is previously set so as to change the request signal transmission output level in two steps. The two-step levels of the request signal transmission output level are a low output level and a high output level. The low output level is determined by aiming at preventing radio waves for transmitting a request signal from leaking through the windows of the doors 11 to 13 as much as possible. The high output level is determined by aiming at preventing generation of an area, in which the inside-of-vehicle transmitter 2d cannot communicate with the portable unit 1, inside the vehicle.

Figure 3:
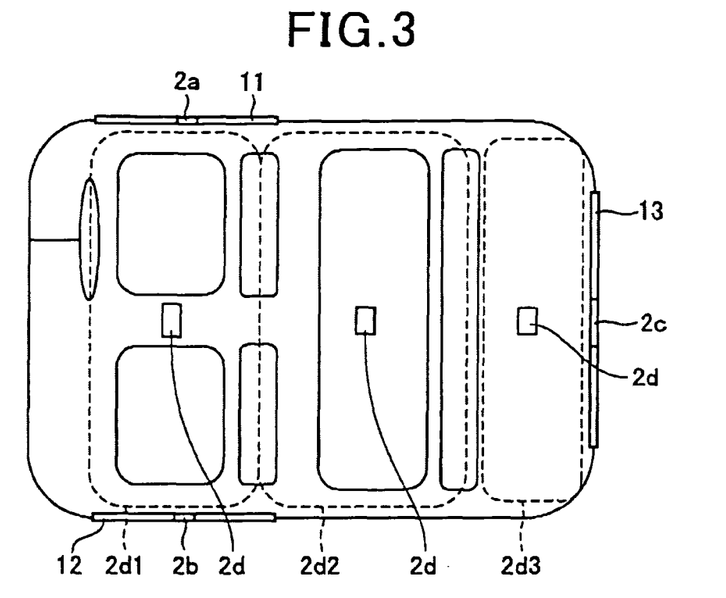
FIG. 3 is a diagram imaginarily showing communication areas (detection areas) formed inside a vehicle according to the embodiment of the present invention.
Figure 6:
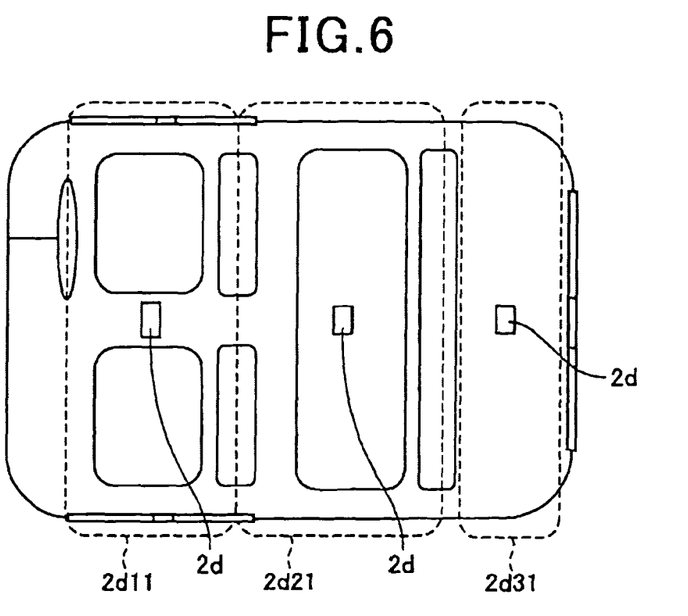
FIG. 6 is a diagram imaginarily showing communication areas (detection areas) formed inside and outside the vehicle according to the embodiment of the present invention.

Hence, when the request signal transmission output level is the low output level, as shown in FIG. 3, first inside-of-vehicle communication areas 2d1 to 2d3 are formed which are prevented from extending to the outside of the vehicle through the windows of the doors 11 to 13. When the request signal transmission output level is the high output level, as shown in FIG. 6; second inside-of-vehicle communication areas 2d11 to 2d31 are formed which completely cover the inside of the vehicle and extend to the outside of the vehicle through the windows of the doors 11 to 13. The first inside-of-vehicle communication area 2d1 and the second inside-of-vehicle communication area 2d11 are formed by the inside-of-vehicle transmitter 2d for front seats. The first inside-of-vehicle communication area 2d2 and the second inside-of-vehicle communication area 2d21 are formed by the inside-of-vehicle transmitter 2d for rear seats. The first inside-of-vehicle communication area 2d3 and the second inside-of-vehicle communication area 2d31 are formed by the inside-of-vehicle transmitter 2d for a luggage room.

The vehicle-side unit includes a receiver 3 which is provided inside the vehicle 10. The receiver 3 is set to a state in which a response signal can be received, synchronized with the outputs of transmission indicating signals to the outside-of-vehicle transmitters 2a to 2c. Then, the receiver 3 receives a response signal transmitted from the portable unit 1. The receiver 3 outputs the received response signal to the control unit 4.

The control unit 4 checks, for example, whether the ID code included in the received response signal agrees with the previously registered registration code. That is, the control unit 4 checks whether or not a predetermined relationship between the ID code and the registration code is met. In other words, the control unit 4 determines whether or not the control unit 4 has received a response signal including the ID code which meets a predetermined relationship with the registration code.

As described above, the control unit 4 transmits request signals from the outside-of-vehicle transmitters 2a to 2c. Then, the control unit 4 determines whether or not the receiver 3 has received a response signal, which has responded to the request signal, including the ID code which meets a predetermined relationship with the registration code. Based on the determination result, the control unit 4 can detect whether or not a person who carries the portable unit 1 is at the periphery of the vehicle 10 (i.e. whether or not the portable unit 1 is at the periphery of the vehicle 10) (see FIG. 4). In addition, the control unit 4 transmits request signals from the inside-of-vehicle transmitter 2d. Then, the control unit 4 determines whether or not the receiver 3 has received a response signal, which has responded to the request signal, including the ID code which meets a predetermined relationship with the registration code. Based on the determination result, the control unit 4 can detect whether or not a person who carries the portable unit 1 is present inside the vehicle 10 (i.e. whether or not the portable unit 1 is present inside the vehicle 10) (see FIG. 4).

Note that the case where a response signal is received, which includes the ID code which meets a predetermined relationship with the registration code, is also simply referred to as "presence of reception". When a predetermined relationship is met between the ID code and the registration code, the check result is also referred to as "OK" (check OK). The case where a response signal is not received, which includes the ID code which meets a predetermined relationship with the registration code, is also referred to as "absence of reception". When a predetermined relationship is not met between the ID code and the registration code, or when no response signal has been received, the check result is referred to as "NG" (i.e. not good) (check NG).

Then, the control unit 4 automatically locks and unlocks the doors 11 to 13 based on whether the check result is "OK" or "NG". In other words, the control unit 4 automatically locks and unlocks the doors 11 to 13 based on whether or not a response signal has been received which includes the ID code which has a predetermined relationship with the registration code.

In the present embodiment, when the control unit 4 has received a response signal including the ID code which has a predetermined relationship with the registration code ("check OK", "presence of reception"), the control unit 4 stores history information, which indicates the fact that the response signal has been received, in the memory 42. When the history information indicating the fact that the response signal has been received is stored in the memory 42, information indicating the communication area (one of the first outside-of-vehicle communication area 2a1 to the third outside-of-vehicle communication area 2c1) may be added to the history information. Regarding the communication area, it has been determined that a response signal has received from the communication area. Due to the history information, even when the passenger carrying the portable unit 1 leaves the vehicle before the other passengers leave the vehicle, the doors 11 to 13 can be automatically locked. That is, in the state where the passenger carrying the portable unit 1 is not at the periphery of the vehicle (communication area), the doors 11 to 13 can be automatically locked even when a passenger who does not carry the portable unit 1 has closed one of the doors.

The control unit 4 controls the start and stop of power supply to the units installed in the vehicle. The control unit 4 outputs driving signals for locking and unlocking the doors 11 to 13 to lock controllers 5a to 5c provided in the doors 11 to 13.

Courtesy switches 7a to 7c are provided so as to correspond to the doors 11 to 13, and detect opening and closing of the doors 11 to 13. The control unit 4 receives signals from the courtesy switches 7a to 7c. The control unit 4 detects an opened state and a closed state of the doors 11 to 13 based on the signals received from the courtesy switches 7a to 7c (door opening and closing detecting means (unit)).

The vehicle-side unit includes lock controllers 5a to 5c which are provided in the doors 11 to 13 of the vehicle 10 and lock and unlock the doors 11 to 13. Specifically, the lock controllers 5a to 5c have door lock motors which rotate in forward and reverse directions in accordance with a locking signal and an unlocking signal transmitted from the control unit 4. The rotations of the door lock motors lock and unlock the doors 11 to 13.

Door handles 6a to 6c of the doors 11 to 13 of the vehicle 10 are provided with touch sensors 6a1 to 6c1 (in FIG. 1, represented as "sensor"), respectively. Due to the touch sensors 6a1 to 6c1, the fact can be detected that the person carrying the portable unit 1 has touched and operated the door handles 6a to 6c. The door handles 6a to 6c are provided with door lock switches 6a2 to 6c2 (in FIG. 1, represented as "SW"), respectively, configured as push switches. Operating the door lock switches 6a2 to 6c2 can lock the doors 11 to 13. Note that the door lock switches 6a2 to 6c2 are not limited to push switches. Touch sensors (in FIG. 1, represented as "sensor") can be used for the door lock switches 6a2 to 6c2. The door handles 6a to 6c also act as antennas of the outside-of-vehicle transmitters 2a to 2c.

The operation of the doors 11 to 13 by the person carrying the portable unit 1 may be detected by using detection mechanisms or the like instead of the touch sensors 6a1 to 6c1. The detection mechanisms mechanically detect the fact that the door handles 6a to 6c are pulled. The door handles 6a to 6c may be provided with unlock buttons. When the unlock buttons are operated, the operations of the doors 11 to 13 are detected. The doors 11 to 13 may be provided with one of the touch sensors 6a1 to 6c1 and the door lock switches 6a2 to 6c2, which are used as both the operating parts for unlocking and the operating parts for locking.

Figure 2:
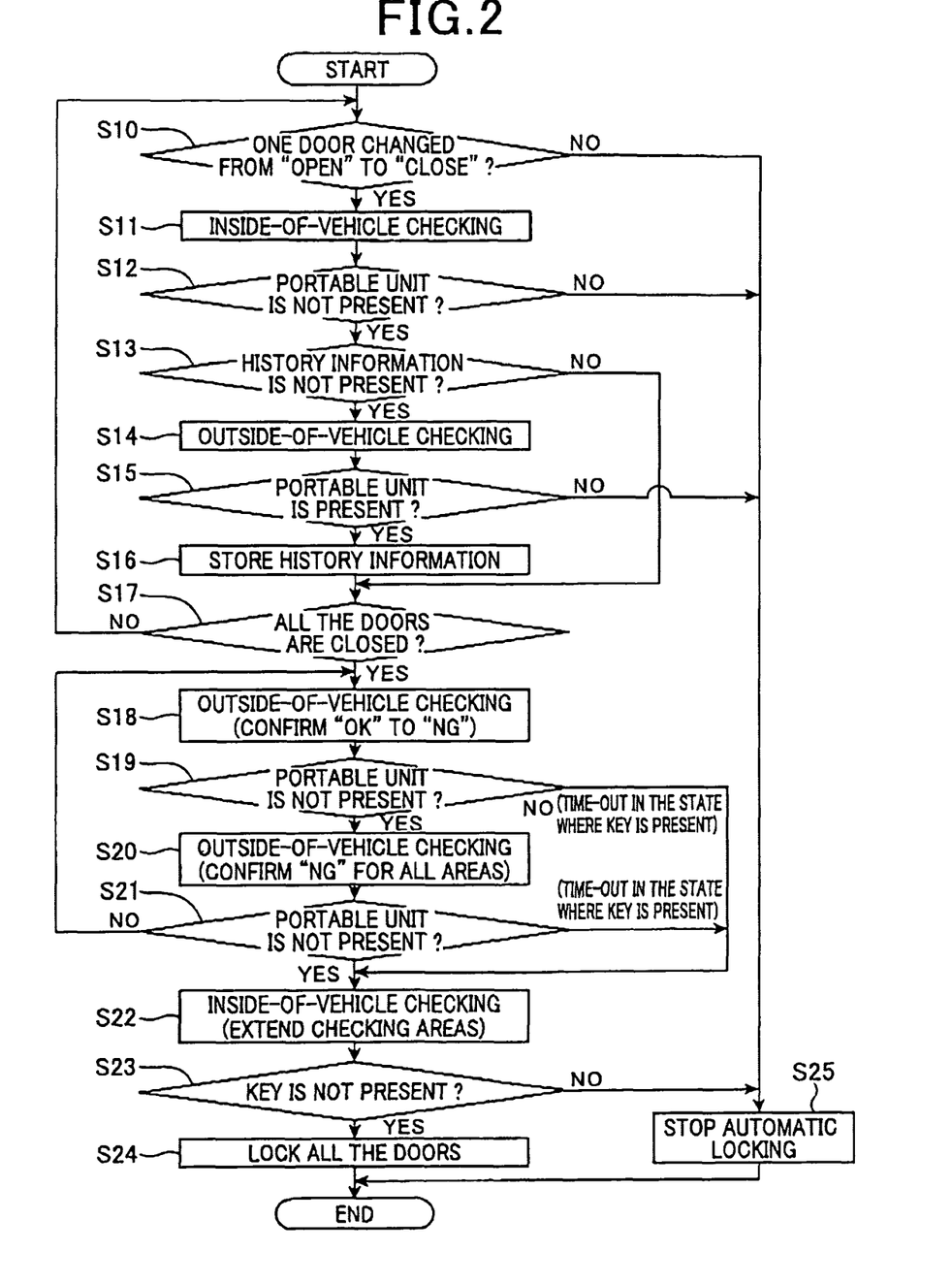
FIG. 2 is a flow chart showing the operation of the automatic locking apparatus according to the embodiment of the present invention.

Next, the operation of the automatic locking apparatus according to the embodiment will be described with reference to FIGS. 2 to 6. The processes of the automatic locking apparatus shown in the flow chart of FIG. 2 are executed (started) at predetermined intervals while power is supplied to the vehicle-side unit.

In step S10, the control unit 4 (CPU 41) determines whether or not one of the doors 11 to 13 changes from the opened state to the closed state based on a signal from the courtesy switches 7a to 7c. When the control unit 4 determines that one of the doors 11 to 13 has changed from the opened state to the closed state, the control unit 4 proceeds to the process in step S11. When the control unit 4 does not determine that one of the doors 11 to 13 has changed from the opened state to the closed state, the control unit 4 proceeds to the process in step S25.

In step S11, the control unit 4 (CPU 41) performs inside-of-vehicle checking process (inside-of-vehicle determining means (unit)) for determining whether or not the portable unit

1 is present inside the vehicle. That is, the control unit 4 (CPU 41) transmits request signals from the inside-of-vehicle transmitter 2*d* to, as shown in FIG. 3, form a first inside-of-vehicle communication area 2*d*1 for front seats, a first inside-of-vehicle communication area 2*d*2 for rear seats, and a first inside-of-vehicle communication area 2*d*3 for a luggage room inside the vehicle. Then, the control unit 4 (CPU 41) determines whether or not the receiver 3 has received a response signal, which has responded to the request signal, including the ID code which meets a predetermined relationship with the registration code from each of the first inside-of-vehicle communication area 2*d*1, the first inside-of-vehicle communication area 2*d*2, and the first inside-of-vehicle communication area 2*d*3 (presence/absence of reception of a response signal).

In this case, the control unit 4 (CPU 41) makes the output level adjusting circuit set the request signal transmission output level of the inside-of-vehicle transmitter 2*d* to a low output level. Hence, as shown in FIG. 3, the first inside-of-vehicle communication areas 2*d*1 to 2*d*3 are formed which are prevented from being extended to the outside of the vehicle through the windows of the doors 11 to 13. Note that the order of checking inside the vehicle may be, for example, as follows: the front seats, the rear seats, and the luggage room. That is, the control unit 4 forms the communication areas in the order of the first inside-of-vehicle communication area 2*d*1, the first inside-of-vehicle communication area 2*d*2, and the first inside-of-vehicle communication area 2*d*3, and performs checking in this order.

In step S12, when the control unit 4 (CPU 41) determines that the receiver 3 has received a response signal including the ID code which meets a predetermined relationship with the registration code (determination that the portable unit 1 is present), the control unit 4 assumes that the portable unit 1 is present inside the vehicle and proceeds to the process in step S25. When the control unit 4 (CPU 41) determines that the receiver 3 has not received a response signal including the ID code which meet a predetermined relationship with the registration code (determination that the portable unit 1 is not present), the control unit 4 assumes that the portable unit 1 is not present inside the vehicle and proceeds to the process in step S13 (inside-of-vehicle determining means (unit)).

As described above, when the control unit 4 (CPU 41) determines that one of the doors 11 to 13 changes from the opened state to the closed state based on a signal from the courtesy switches 7*a* to 7*c*, the control unit 4 forms communication areas for performing intercommunication with the portable unit 1 inside the vehicle, and determines whether or not a response signal is received (inside-of-vehicle determining means (unit)).

In step S13, the control unit 4 (CPU 41) determines whether or not the memory 42 has history information (whether or not history information is stored in the memory 42). When the control unit 4 (CPU 41) determines that the memory 42 has history information (history information is stored in the memory 42), the control unit 4 (CPU 41) proceeds to step S17. When the control unit 4 (CPU 41) determines that the memory 42 does not have history information (history information is not stored in the memory 42), the control unit 4 (CPU 41) proceeds to step S14. The above determination whether or not the memory 42 has history information is performed to determine whether or not the passenger carrying the portable unit 1 has already left the vehicle, that is, whether or not the passenger carrying the portable unit 1 has already left the first outside-of-vehicle communication area 2*a*1 to the third outside-of-vehicle communication area 2*c*1. Therefore, when the control unit 4 (CPU 41) determines that the memory 42 has history information, the control unit 4 (CPU 41) assumes that the passenger carrying the portable unit 1 has already gone away from the vehicle, and proceeds to the step (step S17) of determining whether or not all of the doors are closed, which is one condition for determining whether or not the doors 11 to 13 should be automatically locked.

Figure 4:
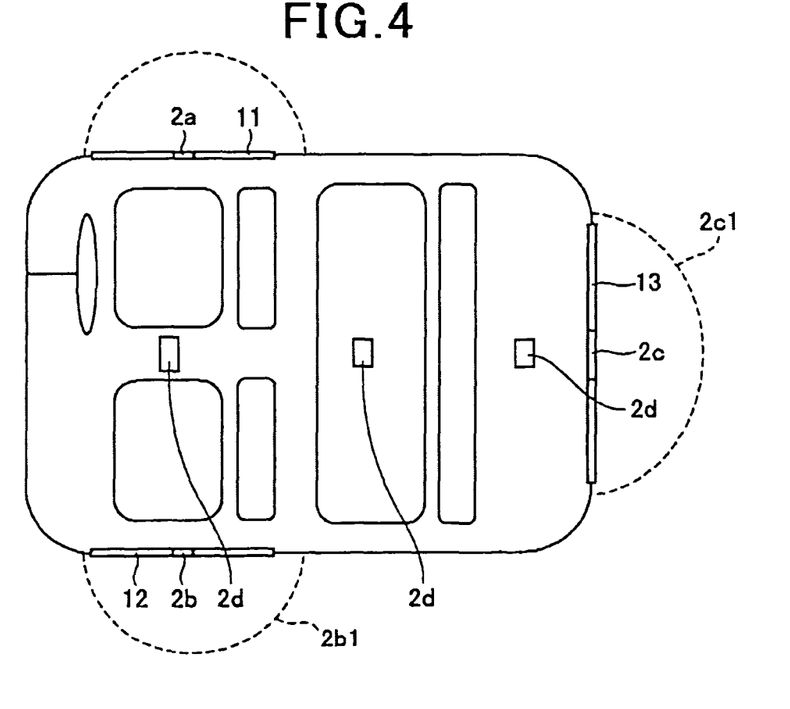
FIG. 4 is a diagram imaginarily showing communication areas (detection areas) formed in predetermined areas outside the vehicle according to the embodiment of the present invention.

In step S14, the control unit 4 (CPU 41) performs the outside-of-vehicle checking process (outside-of-vehicle determining means (unit)) for determining whether or not the portable unit 1 is present outside the vehicle for all the areas of the outside of the vehicle (the first outside-of-vehicle communication area 2*a*1 to the third outside-of-vehicle communication area 2*c*1). That is, the control unit 4 (CPU 41) transmits request signals from the outside-of-vehicle transmitters 2*a* to 2*c* provided in the doors 11 to 13, as shown in FIG. 4, and forms a first outside-of-vehicle communication area ga1, a second outside-of-vehicle communication area 2*b*2, and a third outside-of-vehicle communication area 2*c*3 in predetermined areas at the periphery of the respective doors 11 to 13. Then, the control unit 4 (CPU 41) determines whether or not the receiver 3 has received a response signal, which has responded to the request signal, including the ID code which meets a predetermined relationship with the registration code from each of the first outside-of-vehicle communication area 2*a*1, the second outside-of-vehicle communication area 2*b*1, and the third outside-of-vehicle communication area 2*c*1 formed in the vicinity of the respective doors 11 to 13 (presence/absence of reception of the response signal).

Note that, in the above case, the outside-of-vehicle checking process is performed in the order of, for example, the driver's seat side, the passenger seat side, and the luggage room side. That is, the communication areas are formed in the order of the first outside-of-vehicle communication area 2*a*1, the second outside-of-vehicle communication area 2*b*1, and the third outside-of-vehicle communication area 2*c*1, and the checking process is performed in this order. As described above, the outside-of-vehicle checking process is performed for all the outside-of-vehicle communication areas to enable the doors 11 to 13 to be automatically locked even when the passenger carrying the portable unit 1 is the last person who has closed the door in a state where the passenger carrying the portable unit 1 is in the vicinity of the vehicle.

In addition, the checking process may not be performed in the communication area corresponding to the door (any door included in the doors 11 to 13) which is locked. When all the doors 11 to 13 are unlocked, the checking process is performed for the first outside-of-vehicle communication area 2*a*1, the second outside-of-vehicle communication area 2*b*1, and the third outside-of-vehicle communication area 2*c*1. When the door 11 of the driver's seat side is unlocked, the checking process is performed for the first outside-of-vehicle communication area 2*a*1. When only the door 11 of the driver's seat side is locked, the checking process is performed for the second outside-of-vehicle communication area 2*b*1 (passenger seat is side) and the third outside-of-vehicle communication area 2*c*1 (luggage room side). When only the door 12 of the passenger seat side is locked, the checking process is performed for the first outside-of-vehicle communication area 2*a*1 (driver's seat side) and the third outside-of-vehicle communication area 2*c*1 (luggage room side). When all the doors 11 to 13 are locked, the checking process is not performed at all.

Furthermore, the transmitters 2*a* to 2*c* may transmit the request signals (for the checking process) intermittently. When the request signals (for the checking process) are transmitted intermittently, the intermittent cycle may be customizable. The condition for ending the outside-of-vehicle checking process of step S14 may be that the check result is "OK" (check OK) or that time-out is detected in the state where the check result is "NG" (check NG). The period of time for the time-out may be customizable (for example, 15, 30, 45, or 60 s).

In step S15, when the control unit 4 (CPU 41) determines that the receiver 3 has received a response signal including the ID code which meets a predetermined relationship with the registration code (determination that the portable unit 1 is present), the control unit 4 assumes that the portable unit 1 is present outside the vehicle and proceeds to the process in step S16. When a predetermined period of time has elapsed during which the control unit 4 (CPU 41) determines that the receiver 3 has not received a response signal including the ID code which meets a predetermined relationship with the registration code (determination that the portable unit 1 is not present), the control unit 4 (CPU 41) assumes that time-out is detected in the state where the portable unit 1 is not present outside the vehicle, and proceeds to the process in step S25 (outside-of-vehicle determining means (unit)).

In step S16, when it is determined that the response signal is received in step S15, the control unit 4 (CPU 41) stores the information indicating that the response signal is received, in addition to the information indicating the communication area (one of the first outside-of-vehicle communication area 2a1 to the third outside-of-vehicle communication area 2c1) which is determined that the response signal is received from the communication area, to the memory 42 as history information (storing means (unit)).

In step S17, the control unit 4 (CPU 41) determines whether or not all the doors 11 to 13 are closed based on the signals from the courtesy switches 7a to 7c. When the control unit 4 (CPU 41) determines that all the doors 11 to 13 are closed, the control unit 4 (CPU 41) proceeds to step S18. When the control unit 4 (CPU 41) determines that one of the doors 11 to 13 is opened, the control unit 4 (CPU 41) returns to step S10.

In step S18, the control unit 4 (CPU 41) performs the outside-of-vehicle checking process (outside-of-vehicle determining means (unit)) for determining whether or not the portable unit 1 is present outside the vehicle. In this outside-of-vehicle checking process, it is determined whether or not the check result has changed from "check OK" to "check NG". That is, it is determined whether or not the passenger carrying the portable unit 1 has got out of and gone away from the vehicle. Hence, the checking is performed only in the communication area (one of the first outside-of-vehicle communication area 2a1 to the third outside-of-vehicle communication area 2c1) in which the check result of the outside-of-vehicle checking process in steps S14 and S15 is "check OK" or the history information stored in the memory 42 indicates "check OK". That is, when the check result of the outside-of-vehicle checking process in steps S14 and S15 is "check OK" or the history information is stored in the memory 42, the next determination (steps S18 and S19) is performed in a state where only the communication area is formed which is determined that the response signal is received from the communication area. Hereinafter, it is assumed that the check result has been "check OK" in the first outside-of-vehicle communication area 2a1 of the driver's seat side.

Figure 5:
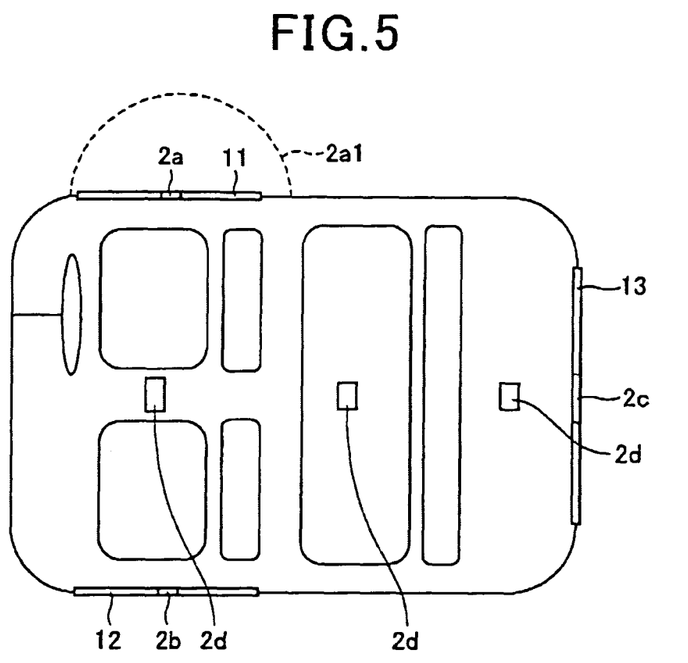
FIG. 5 is a diagram imaginarily showing communication areas (detection areas) formed in parts of predetermined areas outside the vehicle according to the embodiment of the present invention.

The control unit 4 (CPU 41) transmits a request signal from only the outside-of-vehicle transmitter 2a provided in the doors 11 of the driver's seat side to form, as shown in FIG. 5, only the first outside-of-vehicle communication area 2a1 in a predetermined area at the periphery of the door 11. Then, when the first outside-of-vehicle communication area 2a1 is formed in a predetermined area at the periphery of the door 11, the control unit 4 determines whether or not the receiver 3 has received a response signal, which has responded to the request signal, including the ID code which meets a predetermined relationship with the registration code (presence/absence of reception of the response signal)(outside-of-vehicle determining means (unit)).

Note that the transmitter 2a may transmit the request signal (for the checking process) intermittently. When the request signal (for the checking process) is transmitted intermittently, the intermittent cycle may be customizable.

The condition for ending the outside-of-vehicle checking process of step S18 may be that the check result is "NG" (check NG) or that time-out is detected in the state where the check result is "OK" (check OK). The period of time for the time-out may be customizable (for example, 15, 30, 45, or 60 s).

In step S19, when the control unit 4 (CPU 41) determines that the receiver 3 has not received a response signal including the ID code which meets a predetermined relationship with the registration code (determination that the portable unit 1 is not present), the control unit 4 assumes that the passenger carrying the portable unit 1 has got out of the vehicle through a door (door 1) and gone away from the door (the passenger carrying the portable unit 1 has left the first outside-of-vehicle communication area 2a1). Then, the control unit 4 proceeds to step S20. When a predetermined period of time has elapsed during which the control unit 4 (CPU 41) determines that the receiver 3 has received a response signal including the ID code which meet a predetermined is relationship with the registration code (determination that the portable unit 1 is present), the control unit 4 (CPU 41) assumes that time-out is detected in the state where the portable unit 1 is present outside the vehicle, and proceeds to the process in step S22 (outside-of-vehicle determining means (unit)).

In step S20, the control unit 4 (CPU 41) performs the outside-of-vehicle checking process for all the areas of the outside of the vehicle (the first outside-of-vehicle communication area 2a1 to the third outside-of-vehicle communication area 2c1) to confirm that the portable unit 1 is in none of the areas of the outside of the vehicle (the first outside-of-vehicle communication area 2a1 to the third outside-of-vehicle communication area 2c1). That is, the control unit 4 (CPU 41) transmits request signals from the outside-of-vehicle transmitters 2a to 2c provided in the doors 11 to 13 to, as shown in FIG. 4, form the first outside-of-vehicle communication area 2a1, the second so outside-of-vehicle communication area 2b2, and the third outside-of-vehicle communication area 2c3 in predetermined areas at the periphery of the respective doors 11 to 13. Then, the control unit 4 (CPU 41) determines whether or not the receiver 3 has received a response signal, which has responded to the request signal, including the ID code which meets a predetermined relationship with the registration code from the respective first outside-of-vehicle communication area 2a1, second outside-of-vehicle communication area 2b1, and third outside-of-vehicle communication area 2c1 formed in the vicinity of the respective doors 11 to 13 (presence/absence of reception of the response signal) (outside-of-vehicle determining means (unit)).

Note that, in the above case, the outside-of-vehicle checking process is performed in the order of, for example, the driver's seat side, the passenger seat side, and the luggage room side. That is, the communication areas are formed in the order of the first outside-of-vehicle communication area 2a1, the second outside-of-vehicle communication area 2b1, and the third outside-of-vehicle communication area 2c1, and the checking process is performed in this order. As described above, the outside-of-vehicle checking process is performed for all the outside-of-vehicle communication areas to enable the doors 11 to 13 to be automatically locked even when the passenger carrying the portable unit 1 is the last person who has closed the door in a state where the passenger carrying the portable unit 1 is in the vicinity of the vehicle.

In addition, the checking process may not be performed in the communication areas corresponding to the door (any door of the doors 11 to 13) which is locked. When all the doors 11 to 13 are unlocked, the checking process is performed for the first outside-of-vehicle communication area 2a1, the second outside-of-vehicle communication area 2b1, and the third outside-of-vehicle communication area 2c1. When the door 11 of the driver's seat side is unlocked, the checking process is performed for the first outside-of-vehicle communication area 2a1. When only the door 11 of the driver's seat side is locked, the checking process is performed for the second outside-of-vehicle communication area 2b1 (passenger seat side) and the third outside-of-vehicle communication area 2c1 (luggage room side). When only the door 12 of the passenger seat side is locked, the checking process is performed for the first outside-of-vehicle communication area 2a1 (driver's seat side) and the third outside-of-vehicle communication area 2c1 (luggage room side). When all the doors 11 to 13 are locked, the checking process is not performed at all.

Furthermore, the transmitters 2a to 2c may transmit the request signals (for the checking process) intermittently. When the request signals (for the checking process) are transmitted intermittently, the intermittent cycle may be customizable.

The condition for ending the outside-of-vehicle checking process of step S21 may be that the check result is "OK" (check OK), that time-out is detected in the state where the check result is "OK" (check OK), or that the check result is "NG" (check NG) three times consecutively in all the outside-of-vehicle communication areas (the first outside-of-vehicle communication area 2a1, the second outside-of-vehicle communication area 2b1, and the third outside-of-vehicle communication area 2c1). The number of times of "NG" (check NG) may be customizable (for example, 1, 3, 5, 7, 9, 12, 15 or 20 times). The period of time for the time-out may be customizable (for example, 15, 30, 45, or 60 s).

In step S21, when the determination is repeated three times that the receiver 3 has not received a response signal including the ID code, which meets a predetermined relationship with the registration code, from any of the areas (determination that the portable unit 1 is not present), the control unit 4 (CPU 41) assumes that the portable unit 1 is not present outside the vehicle, and proceeds to the process in step S22. Assuming that the portable unit 1 is not present outside the vehicle, when the determination result is "NG" (check NG) a predetermined number of times (three times) consecutively in all the areas, improves determination accuracy. Conversely, when the control unit 4 (CPU 41) determines that the receiver 3 has received a response signal including the ID code which meets a predetermined relationship with the registration code (determination that the portable unit 1 is present), the control unit 4 (CPU 41) returns to step S18. Furthermore, When a predetermined period of time has elapsed during which the control unit 4 (CPU 41) determines that the receiver 3 has received a response signal including the ID code which meets a predetermined relationship with the registration code (determination that the portable unit 1 is present), the control unit 4 (CPU 41) assumes that time-out is detected in the state where the portable unit 1 is present outside the vehicle, and proceeds to the process in step S22 (outside-of-vehicle determining means (unit)). In the present embodiment, the determination is repeated three times that the receiver 3 has not received a response signal (determination that the portable unit 1 is not present). However, not only three times but also one time, two times, four times or more may be applied.

In step S22, the control unit 4 (CPU 41) performs the inside-of-vehicle checking process (inside-of-vehicle determining means (unit)) for reconfirming that the portable unit 1 is not present inside the vehicle (inside-of-and-outside-of vehicle determining means (unit)). That is, the control unit 4 (CPU 41) transmits request signals from the inside-of-vehicle transmitter 2d provided inside the vehicle to, as shown in FIG. 6, form the second inside-of-vehicle communication areas 2d11 to 2d31 which completely cover the inside of the vehicle and extend to the outside of the vehicle through the windows of the doors 11 to 13. Then, the control unit 4 (CPU 41) determines whether or not the receiver 3 has received a response signal, which has responded to the request signal, including the ID code which meets a predetermined relationship with the registration code from the respective second inside-of-vehicle communication area 2d11, second inside-of-vehicle communication area 2d21, and second inside-of-vehicle communication area 2d31 (presence/absence of reception of the response signal) (inside-of-vehicle determining means (unit)).

In this case, the control unit 4 (CPU 41) makes the output level adjusting circuit set the request signal transmission output level of the inside-of-vehicle transmitter 2d to a high output level. Hence, as shown in FIG. 6, the second inside-of-vehicle communication areas 2d11 to 2d31 are formed which completely cover the inside of the vehicle and extend to the outside of the vehicle through the windows of the doors 11 to 13. Note that the order of checking the inside of the vehicle may be, for example, the front seats, the rear seats, and the luggage room, which is one cycle. That is, the control unit 4 forms the communication areas in the order of the second inside-of-vehicle communication area 2d11, the second inside-of-vehicle communication area 2d21, and the second inside-of-vehicle communication area 2d31, and performs checking in this order.

In step S23, when the control unit 4 (CPU 41) determines that the receiver 3 has received a response signal including the ID code which meets a predetermined relationship with the registration code (determination that the portable unit 1 is present), the control unit 4 assumes that the portable unit 1 is present inside the vehicle and proceeds to the process in step S25. When the control unit 4 (CPU 41) determines that the receiver 3 has not received a response signal including the ID code which meets a predetermined relationship with the registration codes (determination that the portable unit 1 is not present), the control unit 4 assumes that the portable unit 1 is not present inside the vehicle, and proceeds to the process in step S24 (inside-of-and-outside-of vehicle determining means (unit)). As described above, the communication areas are extended, and the inside-of-vehicle checking process is performed again. Then, it is confirmed that the portable unit 1 is not present inside the vehicle. Thereby, the portable unit 1 is prevented from being contained (accidentally left) inside the vehicle.

In step S24, the control unit 4 (CPU 41) automatically locks all the doors 11 to 13 (locking control means (unit)). In this case, the control unit 4 (CPU 41) outputs locking signals, which indicate to lock the doors 11 to 13, to locking controllers 5a to 5c provided in the doors 11 to 13. When receiving the locking signals, the locking controllers 5a to 5c rotate the door lock motors to lock the doors 11 to 13. Thereafter, the process is completed. If history information is stored in the memory 42, the control unit 4 (CPU 41) clears the history information stored in the memory 42 at this time.

In step S25, the control unit 4 (CPU 41) stops the automatic locking (which automatically locks the doors 11 to 13), then completes the process. When history information is stored in the memory 42, the control unit 4 (CPU 41) clears the history information stored in the memory 42 at this time.

According to the above process, in a case where history information is stored in the memory 42, when all the doors 11 to 13 are closed, the doors 11 to 13 can be automatically locked even when the portable unit 1 is not in the first outside-of-vehicle communication area 2a1 to the third outside-of-vehicle communication area 2c1.

This is because it can be assumed that the passenger carrying the portable unit 1 has closed one of the doors 11 to 13 and gone away from the vehicle before the other passengers leave the vehicle, when the determination result of the inside-of-vehicle checking process of steps S11 and 512 is "check NG", the determination result of step S13 indicates that history information is stored, and the determination result of the outside-of-vehicle checking process of steps S18 and S19 is "check NG". In other words, it can be assumed that the passenger carrying the portable unit 1 has closed the door and gone away from the vehicle before the other passengers leave the vehicle, when the portable unit 1 is not in the communication areas inside and outside of the vehicle (the first inside-of-vehicle communication areas 2d1 to 2d3, and the first outside-of-vehicle communication area 2a1 to the third outside-of-vehicle communication area 2c1), and history information remains which indicates that the portable unit was in a predetermined area outside the vehicle.

Hence, in the case where history information is stored in the memory 42, and the passengers open the doors (at least two of the doors 11 to 13) and get out of the vehicle, when the passenger carrying the portable unit 1 is the first person who has closed the door (one of the doors 11 to 13) and left the first outside-of-vehicle communication area 2a1 to the third outside-of-vehicle communication area 2c1, all the doors 11 to 13 can be automatically locked even after the other passenger has closed the door (one of the doors 11 to 13) and left the vehicle.

Specifically, when power slide doors are used, for example, a long period of time may be required to close the doors. Hence, the passenger carrying the portable unit 1 may wait in the vicinity of the vehicle. However, the automatic locking apparatus of the present embodiment allows all the doors to be automatically locked even when the passenger carrying the portable unit 1 does not wait in the vicinity of the vehicle.

In the above embodiment, steps S20 to S23 are included. However, the present invention is not limited to this embodiment. A first modification will be described below. In step S19, when the control unit 4 (CPU 41) determines that the portable unit 1 is not present outside the vehicle (determination that the portable unit 1 is not present), the control unit 24 may proceed to step S24 to automatically lock all the doors 11 to 13. Even in this modification, in the case where history information is stored in the memory 42, and the passengers open the doors (at least two of the doors 11 to 13) and get out the vehicle, when the passenger carrying the portable unit 1 is the first person who has closed the door (one of the doors 11 to 13) and left the first outside-of-vehicle communication area 2a1 to the third outside-of-vehicle communication area 2c1, all the doors 11 to 13 can be automatically locked even after the other passenger has closed the door (one of the doors 11 to 13) and left the vehicle. That is, in the case where the check result of the inside-of-vehicle checking process is "check NG" and history information is stored in the memory 42, the doors are automatically locked on the condition that all the doors 11 to 13 are closed and the check result of the outside-of-vehicle checking process is "check NG". In such a case, an object of the present invention can be also achieved.

A second modification will be described below. The condition that the check result of the outside-of-vehicle checking process is "check NG" in all the communication areas outside the vehicle (the first outside-of-vehicle communication area 2a1 to the third outside-of-vehicle communication area 2c1) may be added to the first modification. That is, in step S21, when the control unit 4 (CPU 41) determines that the portable unit 1 is not present outside the vehicle (determination that the portable unit 1 is not present), the control unit 24 may proceed to step S24 to automatically lock all the doors 11 to 13. Even in this modification, in the case where history information is stored in the memory 42, and the passengers open the doors (at least two of the doors 11 to 13) and get out of the vehicle, when the passenger carrying the portable unit 1 is the first person who has closed the door (one of the doors 11 to 13) and left the first outside-of-vehicle communication area 2a1 to the third outside-of-vehicle communication area 2c1, all the doors 11 to 13 can be automatically locked even after the other passenger has closed the door (one of the doors 11 to 13) and left the vehicle.

A third modification will be described below. Steps S20 and S21 may be omitted from the above embodiment. Even in this modification, in the case where history information is stored in the memory 42, and the passengers open the doors (at least two of the doors 11 to 13) and get out the vehicle, when the passenger carrying the portable unit 1 is the first person who has closed the door (one of the doors 11 to 13) and left the first outside-of-vehicle communication area 2a1 to the third outside-of-vehicle communication area 2c1, all the doors 11 to 13 can be automatically locked even after the other passenger has closed the door (one of the doors 11 to 13) and left the vehicle.

After the step S17 and before all the doors 11 to 13 are automatically locked in step S24 (or before S23), when one of the doors 11 to 13 changes from the closed state to the opened state (when the control unit 4 (CPU 41) detects the fact that one of the doors 11 to 13 changes from the closed state to the opened state based on a signal from the courtesy switches 7a to 7c), the control unit 4 (CPU 41) may proceed to step S25 to stop the automatic locking (which automatically locks the doors 11 to 13).

Alternatively, after the step S17 and before all the doors 11 to 13 are automatically locked in step S24 (or before S22), when one of the doors 11 to 13 changes from the closed state to the opened state (when the control unit 4 (CPU 41) detects the fact that one of the doors 11 to 13 changes from the closed state to the opened state based on a signal from the courtesy switches 7a to 7c), the control unit 4 (CPU 41) may return to step 10 (that is, not proceed to step S25) without stopping the automatic locking (which automatically locks the doors 11 to 13).

The above processes are preferable because the operation can be performed from step S10 again. For example, when the passenger who does not carry the portable unit 1 has closed one of the doors 11 to 13 and immediately afterward the passenger opens the door to take out his belongings, the door can be locked after the door is closed again.

Hereinafter, aspects of the above-described embodiments will be summarized.

The above-described embodiments provide an automatic locking apparatus which is installed in a vehicle having a plurality of doors, communicates with a portable unit in predetermined areas inside and outside the vehicle, and automatically locks the doors, based on whether or not a response signal is received from the portable unit, and the current opened and closed states of the doors, the response signal including an identification signal having a predetermined relationship with an identification signal which is previously registered, the apparatus including: a door opening and closing detecting unit which detects an opened state and a closed state of the doors; an inside-of-vehicle determining unit which forms a communication area, which is for performing intercommunication with the portable unit, inside the vehicle when the door opening and closing detecting unit determines that one of the doors changes from the opened state to the closed state, and determines whether or not the response signal is received; an outside-of-vehicle determining unit which forms a communication area, which is for performing intercommunication with the portable unit, in a predetermined area outside the vehicle when the inside-of-vehicle is determining unit determines that the response signal is not received, and determines whether or not the response signal is received; a locking control unit which automatically locks the doors when the outside-of-vehicle determining unit determines that the response signal is received, on the condition that the door opening and closing detecting unit detects the fact that all the doors are closed, and the condition that the determination result of the outside-of-vehicle determining unit is changed from presence of reception to absence of reception; and a storing unit which stores history information indicating that the response signal is received, when the outside-of-vehicle determining unit determines that the response signal is received, wherein when the inside-of-vehicle determining unit determines that the response signal is not received, and the storing unit stores history information, the locking control unit automatically locks the doors on the condition that the door opening and closing detecting unit detects the fact that all the doors are closed, and the condition that the determination result of the outside-of-vehicle determining unit is absence of reception.

When the inside-of-vehicle determining unit determines that the response signal is not received, the history information indicating that the response signal is received, which is based on the determination result of the outside-of-vehicle determining unit, and the outside-of-vehicle determining unit determines that the response signal is not received, it can be assumed that the passenger carrying the portable unit has closed the door and gone away from the vehicle before the other passengers leave the vehicle. That is, when the portable unit is not present in the predetermined areas inside and outside the vehicle, and history information remains which indicates that the portable unit was present in the predetermined area outside the vehicle, it can be assumed that the passenger carrying the portable unit has closed the door and gone away from the vehicle before the other passengers leave the vehicle. Therefore, when the inside-of-vehicle determining unit determines that the response signal is not received, and the storing unit stores the history information, all the doors are automatically locked when all the doors are closed and even when the portable unit is not present in detection areas outside the vehicle, on the condition that the door opening and closing detecting unit detects the fact that all the doors are closed, and the condition that the determination result of the outside-of-vehicle determining unit is absence of reception.

In addition, the outside-of-vehicle determining unit forms communication areas in predetermined areas at the periphery of the doors, and determines whether or not the response signal is received from the respective communication areas.

The storing unit stores information indicating that the response signal is received, and information indicating the communication area which is determined by the outside-of-vehicle determining unit that the response signal is received from the communication area, as the history information. When the outside-of-vehicle determining unit determines that the response signal is received or the storing unit stores the history information, the outside-of-vehicle determining unit performs next determination in a state where the communication area is formed which is determined that the response signal is received from the communication area.

As described above, when it is once determined that the response signal is received, only the communication area from which the response signal was received is formed, then it is determined again whether or not a response signal is received. This process is preferable because the number of formation of the communication area can be reduced.

In addition, the locking control unit automatically locks the doors on the condition that the door opening and closing detecting unit detects the fact that all the doors are closed and the condition that the determination result of the outside-of-vehicle determining unit is changed from presence of reception to absence of reception, or the condition that the door opening and closing detecting unit detects the fact that all the doors are closed and the condition that the determination result of the outside-of-vehicle determining unit is absence of reception, in addition to the condition that the determination result of the outside-of-vehicle determining unit is absence of reception in all the communication areas.

When the determination results of the outside-of-vehicle determining unit are absence of reception in all the areas, the possibility is high that the passenger carrying the portable unit has gone away from the vehicle. Therefore, according to the above process, the doors can be prevented from being locked when the portable unit is present at the periphery of the vehicle.

In addition, communication areas are formed for performing intercommunication with the portable unit, in predetermined areas inside and outside the vehicle. That is, the communication area inside the vehicle is extended to the outside of the vehicle. Then, presence/absence of reception of a response signal is determined. The determination result indicating the absence of reception may be added to conditions for automatically locking the doors.

This process is preferable because the portable unit is reliably prevented from being contained inside the vehicle.

In addition, before the locking control unit automatically locks the doors, when the door opening and closing detecting unit detects the fact that one of the doors changes from the closed state to the opened state, the locking control unit may stop locking the doors.

In addition, before the locking control unit automatically locks the doors, when the door opening and closing detecting unit detects the fact that one of the doors changes from the closed state to the opened state, the door opening and closing detecting unit may determine whether or not one of the doors changes from the opened state to the closed state.

The above processes are preferable because the process by the inside-of-vehicle determining unit or the like for determining whether or not the doors are automatically locked can be performed again. For example, when the passenger who does not carry the portable unit has closed a door and immediately afterward the passenger opens the door to take out his belongings, the door can be locked after the door is closed again.

It will be appreciated that the present invention is not limited to the configurations described above, but any and all modifications, variations or equivalents, which may occur to those who are skilled in the art, should be considered to fall within the scope of the present invention.

What is claimed is:

1. An automatic locking apparatus which is installed in a vehicle having a plurality of doors, communicates with a portable unit in predetermined areas inside and outside the vehicle, and automatically locks the doors, based on whether or not a response signal is received from the portable unit, and opened and closed states of the doors, the response signal including an identification signal having a predetermined relationship with an identification signal which is previously registered, the apparatus comprising:

a door opening and closing detecting unit which detects an opened state and a closed state of the doors;

an inside-of-vehicle determining unit which forms a communication area, which is for performing intercommunication with the portable unit, inside the vehicle when the door opening and closing detecting unit determines that one of the doors changes from the opened state to the closed state, and determines whether or not the response signal is received;

an outside-of-vehicle determining unit which forms a communication area, which is for performing intercommunication with the portable unit, in a predetermined area outside the vehicle when the inside-of-vehicle determining unit determines that the response signal is not received, and determines whether or not the response signal is received;

a locking control unit which automatically locks the doors when the outside-of-vehicle determining unit determines that the response signal is received, on the condition that the door opening and closing detecting unit detects the fact that all the doors are closed, and the condition that the determination result of the outside-of-vehicle determining unit is changed from presence of reception to absence of reception; and a storing unit which stores history information indicating that the response signal is received, when the outside-of-vehicle determining unit determines that the response signal is received, wherein when the inside-of-vehicle determining unit determines that the response signal is not received, and the storing unit stores the history information, the locking control unit automatically locks the doors on the condition that the door opening and closing detecting unit detects the fact that all the doors are closed, and the condition that the determination result of the outside-of-vehicle determining unit is absence of reception, the outside-of-vehicle determining unit forms communication areas in predetermined areas at the periphery of the doors, and determines whether or not the response signal is received from the respective communication areas, the storing unit stores information indicating that the response signal is received, and information indicating the communication area which is determined by the outside-of-vehicle determining unit that the response signal is received from the communication area, as the history information, when the outside-of-vehicle determining unit determines that the response signal is received or the storing unit stores the history information, the outside-of-vehicle determining unit performs next determination in a state where the communication area is formed which is determined that the response signal is received from the communication area, and the locking control unit automatically locks the doors on the condition that the door opening and closing detecting unit detects the fact that all the doors are closed along with the condition that the determination result of the outside-of-vehicle determining unit is changed from presence of reception to absence of reception, or the condition that the door opening and closing detecting unit detects the fact that all the doors are closed along with the condition that the determination result of the outside-of-vehicle determining unit is absence of reception, in addition to the condition that the determination result of the outside-of-vehicle determining unit is absence of reception in all the communication areas.

2. The automatic locking apparatus according to claim 1, further comprising an inside-of-and-outside-of vehicle determining unit which forms communication areas for performing intercommunication with the portable unit in predetermined areas inside and outside the vehicle, and determines whether or not the response signal is received, wherein the locking control unit automatically locks the doors on the condition that the door opening and closing detecting unit detects the fact that all the doors are closed and the condition that the determination result of the outside-of-vehicle determining unit is changed from presence of reception to absence of reception, or the condition that the door opening and closing detecting unit detects the fact that all the doors are closed and the condition that the determination result of the outside-of-vehicle determining unit is absence of reception, in addition to the condition that the determination result of the inside-of-and-outside-of vehicle determining unit is absence of reception.

3. The automatic locking apparatus according to claim 1, further comprising an inside-of-and-outside-of vehicle determining unit which forms communication areas for performing intercommunication with the portable unit in predetermined areas inside and outside the vehicle, and determines whether or not the response signal is received, wherein the locking control unit automatically locks the doors on the condition that the door opening and closing detecting unit detects the fact that all the doors are closed and the condition that the determination result of the outside-of-vehicle determining unit is changed from presence of reception to absence of reception, or the condition that the door opening and closing detecting unit detects the fact that all the doors are closed, the condition that the determination result of the outside-of-vehicle determining unit is absence of reception, and the condition that the determination result of the outside-of-vehicle determining unit is absence of reception in all the communication areas, in addition to the condition that the determination result of the inside-of-and-outside-of vehicle determining unit is absence of reception.

4. The automatic locking apparatus according to claim 1, wherein before the locking control unit automatically locks the doors, when the door opening and closing detecting unit detects the fact that one of the doors changes from the closed state to the opened state, the locking control unit stops locking the doors.

5. The automatic locking apparatus according to claim 1, wherein before the locking control unit automatically locks the doors, when the door opening and closing detecting unit detects the fact that one of the doors changes from the closed state to the opened state, the door opening and closing detecting unit determines whether or not one of the doors changes from the opened state to the closed state.

6. An automatic locking apparatus which is installed in a vehicle having a plurality of doors, communicates with a portable unit in predetermined areas inside and outside the vehicle, and automatically locks the doors, based on whether or not a response signal is received from the portable unit, and opened and closed states of the doors, the response signal including an identification signal having a predetermined relationship with an identification signal which is previously registered, the apparatus comprising:

a door opening and closing detecting unit which detects an opened state and a closed state of the doors;

an inside-of-vehicle determining unit which forms a communication area, which is for performing intercommunication with the portable unit, inside the vehicle when the door opening and closing detecting unit determines that one of the doors changes from the opened state to the closed state, and determines whether or not the response signal is received;

an outside-of-vehicle determining unit which forms a communication area, which is for performing intercommunication with the portable unit, in a predetermined area outside the vehicle when the inside-of-vehicle determining unit determines that the response signal is not received, and determines whether or not the response signal is received;

a locking control unit which automatically locks the doors when the outside-of-vehicle determining unit determines that the response signal is received, on the condition that the door opening and closing detecting unit detects the fact that all the doors are closed, and the condition that the determination result of the outside-of-vehicle determining unit is changed from presence of reception to absence of reception; and a storing unit which stores history information indicating that the response signal is received, when the outside-of-vehicle determining unit determines that the response signal is received, wherein when the inside-of-vehicle determining unit determines that the response signal is not received, and the storing unit stores history information, the locking control unit automatically locks the doors on the condition that the door opening and closing detecting unit detects the fact that all the doors are closed, and the condition that the determination result of the outside-of-vehicle determining unit is absence of reception;

the outside-of-vehicle determining unit forms a plurality of communication areas in a plurality of predetermined areas at the periphery of the doors, and makes a first determination whether or not the response signal is received from one of the plurality of communication areas, the storing unit stores information indicating that the response signal is received, and information indicating the one of the plurality of communication areas which is determined by the outside-of-vehicle determining unit that the response signal is received from the one of the plurality of communication areas, as the history information, when the outside-of-vehicle determining unit determines that the response signal is received from the one of the plurality of communication areas or the storing unit stores the history information that the response signal is received from the one of the plurality of communication areas, the outside-of-vehicle determining unit performs a second determination in the one of the plurality of communication areas from which the response signal is received; and the locking control unit automatically locks the doors on the condition that the door opening and closing detecting unit detects the fact that all the doors are closed along with the condition that the determination result of the outside-of-vehicle determining unit is changed from presence of reception to absence of reception, or the condition that the door opening and closing detecting unit detects the fact that all the doors are closed along with the condition that the determination result of the outside-of-vehicle determining unit is absence of reception, in addition to the condition that the determination result of the outside-of-vehicle determining unit is absence of reception in all of the plurality of communication areas.

7. The automatic locking apparatus according to claim 6, wherein when the outside-of-vehicle determining unit determines that the response signal is received or the storing unit stores the history information that the response signal is received from the one of the plurality of communication areas, the outside-of-vehicle determining unit performs the second determination in only the one of the plurality of communication areas.

* * * * *